United States Patent
Knudtson et al.

(10) Patent No.: US 11,403,361 B2
(45) Date of Patent: Aug. 2, 2022

(54) IDENTIFYING CODE DEPENDENCIES IN WEB APPLICATIONS

(71) Applicant: Intuit Inc., Mountain View, CA (US)

(72) Inventors: Eric Knudtson, Palo Alto, CA (US); Rajeev Goonewardene, Edmonton (CA); Sonia May-Patlin, Edmonton (CA); Adil Malik, Edmonton (CA); Sina Jalali, Edmonton (CA); Jasmine Woo, Edmonton (CA)

(73) Assignee: Intuit Inc., Mountain View, CA (US)

( * ) Notice: Subject to any disclaimer, the term of this patent is extended or adjusted under 35 U.S.C. 154(b) by 233 days.

(21) Appl. No.: 16/861,828

(22) Filed: Apr. 29, 2020

(65) Prior Publication Data

US 2021/0342413 A1    Nov. 4, 2021

(51) Int. Cl.
| | | |
|---|---|---|
| *G06F 16/955* | (2019.01) | |
| *G06F 8/41* | (2018.01) | |
| *G06F 9/54* | (2006.01) | |
| *G06F 16/957* | (2019.01) | |
| *G06F 16/26* | (2019.01) | |
| *G06F 16/904* | (2019.01) | |
| *G06F 16/84* | (2019.01) | |
| *G06F 16/00* | (2019.01) | |

(Continued)

(52) U.S. Cl.
CPC ......... *G06F 16/9566* (2019.01); *G06F 8/433* (2013.01); *G06F 8/4434* (2013.01); *G06F 9/547* (2013.01); *G06F 8/75* (2013.01); *G06F 16/00* (2019.01); *G06F 16/26* (2019.01); *G06F 16/88* (2019.01); *G06F 16/904* (2019.01); *G06F 16/908* (2019.01); *G06F 16/9577* (2019.01); *G06F 16/972* (2019.01); *G06F 16/986* (2019.01)

(58) Field of Classification Search
CPC .... G06F 16/9566; G06F 8/433; G06F 8/4434; G06F 9/547; G06F 8/75; G06F 16/26; G06F 16/81; G06F 16/88; G06F 16/00; G06F 16/904; G06F 16/908; G06F 16/9577; G06F 16/972; G06F 16/986
See application file for complete search history.

(56) References Cited

U.S. PATENT DOCUMENTS

| | | | | |
|---|---|---|---|---|
| 9,219,787 | B1* | 12/2015 | Manion | H04L 67/142 |
| 9,553,918 | B1* | 1/2017 | Manion | G06F 16/957 |
| 2015/0378966 | A1* | 12/2015 | McWilliams | G06F 40/221 |
| | | | | 715/236 |

OTHER PUBLICATIONS

Coyler, C., "Here's the thing about "unused CSS" tools", https://css-tricks.com/heres-the-thing-about-unused-css-tools/, Jun. 18, 2018, 3 pages.

(Continued)

*Primary Examiner* — Quoc A Tran
(74) *Attorney, Agent, or Firm* — Ferguson Braswell Fraser Kubasta PC (57) ABSTRACT

A method may include receiving, from a browser, a request for a tracking pixel including a uniform resource locator (URL) of the tracking pixel and a session identifier (ID) of the browser. The URL of the tracking pixel may be included in a CSS selector. The method may further include sending, to the browser and as triggered by the request for the tracking pixel, a request to scan a document object model (DOM) of the browser. The request to scan the DOM may include the session ID. The method may further include receiving, from the browser, scan results including a set of dependencies on the CSS selector.

20 Claims, 6 Drawing Sheets

(51) Int. Cl.
*G06F 16/958* (2019.01)
*G06F 8/75* (2018.01)
*G06F 16/908* (2019.01)
*G06F 17/00* (2019.01)

(56) References Cited

OTHER PUBLICATIONS

"Finding Dead CSS", https://csswizardry.com/2018/01/finding-dead-css/, Jan. 17, 2018, 4 pages.

* cited by examiner

IDENTIFYING CODE DEPENDENCIES IN WEB APPLICATIONS

BACKGROUND

Identifying code dependencies in web applications can be challenging and computationally expensive due to the dynamic nature of web applications. For example, thousands of HyperText Markup Language (HTML) elements may exist in a web application that depend on any of the thousands of Cascading Style Sheet (CSS) selectors in a web application codebase. Moreover, many dependencies between HTML elements and CSS selectors manifest only at runtime. For example, CSS rulesets in a web application may be separately and/or independently loaded at runtime, depending on how the user interacts with the web application. Because dependencies are determined at runtime, static analysis and other conventional build-time dependency tracking methods when applied to web applications may be incomplete. As a result, developers may be hesitant to change existing code, opting instead to add new code, resulting in bloated codebases. Bloated codebases have poor performance, and it is challenging to adapt such codebases to satisfy changing requirements in a timely fashion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, from a browser, a request for a tracking pixel including a uniform resource locator (URL) of the tracking pixel and a session identifier (ID) of the browser. The URL of the tracking pixel is included in a CSS selector. The method further includes sending, to the browser and as triggered by the request for the tracking pixel, a request to scan a document object model (DOM) of the browser. The request to scan the DOM includes the session ID. The method further includes receiving, from the browser, scan results including a set of dependencies on the CSS selector.

In general, in one aspect, one or more embodiments relate to a system including an application including a CSS selector, and a tracking pixel server configured to receive, from a browser, a request for a tracking pixel including a uniform resource locator (URL) of the tracking pixel and a session identifier (ID) of the browser. The URL of the tracking pixel is included in the CSS selector. The tracking pixel server is further configured to, in response to receiving the request for the tracking pixel, send, to the browser and as triggered by the request for the tracking pixel, a request to scan a document object model (DOM) of the browser. The request to scan the DOM includes the session ID. The tracking pixel server is further configured to receive, from the browser, scan results including a set of dependencies on the CSS selector.

In general, in one aspect, one or more embodiments relate to a method including receiving a request for an application, and serving the application including code for accessing, by a browser executing the application, a Cascading Style Sheet (CSS) selector, and in response to accessing the CSS selector, sending, by the browser and using a uniform resource locator (URL) of a tracking pixel and a session identifier (ID) of the browser, a request for the tracking pixel. The URL of the tracking pixel is included in the CSS selector. The application further includes code for receiving, by the browser and as triggered by the request for the tracking pixel, a request to scan a document object model (DOM) of the browser. The request to scan the DOM includes the session ID. The application further includes code for in response to receiving the request to scan the DOM, scanning the DOM to obtain scan results including a set of dependencies on the CSS selector, and transmitting the scan results.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to identifying code dependencies in a web application that uses Cascading Style Sheets (CSS). CSS is a mechanism to add formatting (i.e., "style components") to a web application. CSS include CSS declaration blocks defining the style, a CSS rule defining rules for applying a CSS style, and CSS selectors, which are instructions that demarcate the HyperText Markup Language (HTML) element(s) in a webpage to which a CSS rule applies.

One or more embodiments include, in a CSS selector, a uniform resource locator (URL) of a tracking pixel. The tracking pixel is a graphic that is requested by a browser from a server when the browser accesses the CSS selector. When a code fragment in the document object model (DOM) of the browser accesses the CSS selector, the browser sends a tracking pixel request including a CSS selector ID corresponding to the CSS selector and a session ID corresponding to a user session of the browser.

In one or more embodiments, the server responds with a request to scan the DOM of the browser over a point-to-point connection to the specific browser session that sent the request for the tracking pixel. The request to scan the DOM may be sent as a remote procedure call (RPC) via a websocket connection. The browser sends session scan results via the point-to-point connection. The session scan results include a set of dependencies on the CSS selector, whereby each dependency is a code fragment in the DOM that directly or indirectly depends on the CSS selector. Scanning the DOM is efficient and scalable because the scan focuses on identifying dependencies on a single CSS selector. Furthermore, the DOM is scanned incrementally, on demand, as CSS selectors are used during browser sessions.

Scan results for the CSS selector ID received from multiple sessions of multiple browsers executing on multiple user computing systems are aggregated. When the total number of dependencies on a CSS selector is within an obsolescence threshold, then the CSS selector may be marked as a candidate for obsolescence. Identifying and subsequently removing obsolete CSS selectors from an application may reduce the size of the application, and thus improve the performance of the application.

Figure 1:
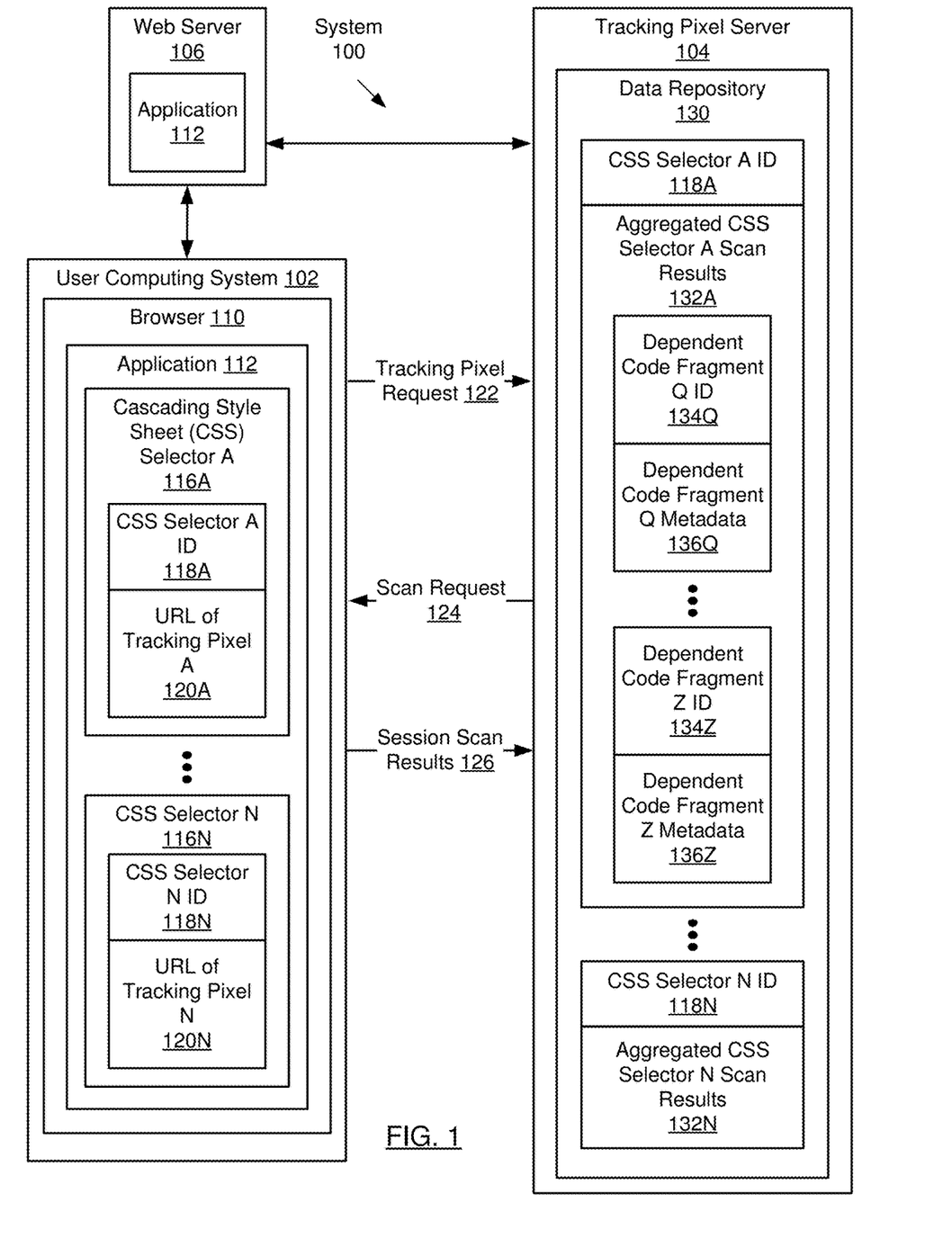
FIG. 1 shows a system in accordance with one or more embodiments of the invention.
Figure 6A:
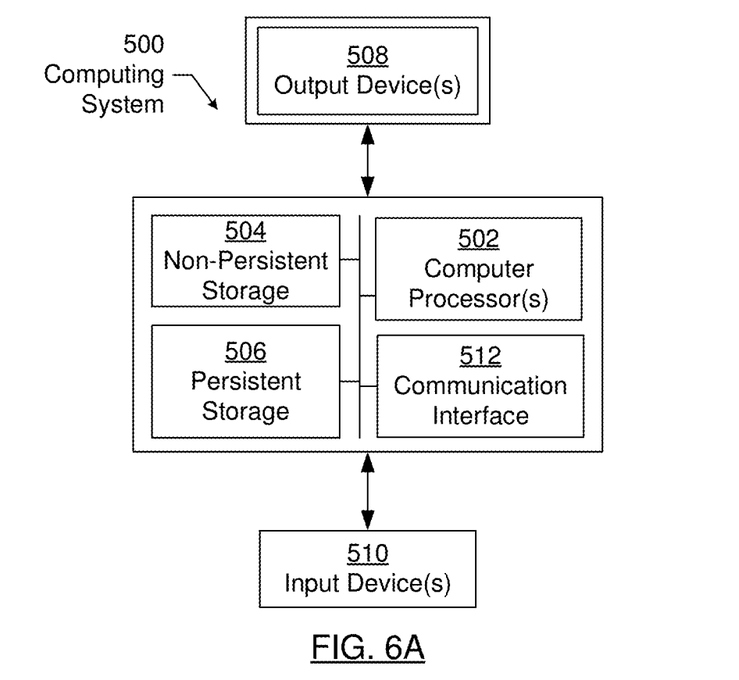
FIG. 6A and FIG. 6B show computing systems in accordance with one or more embodiments of the invention.
Figure 6B:
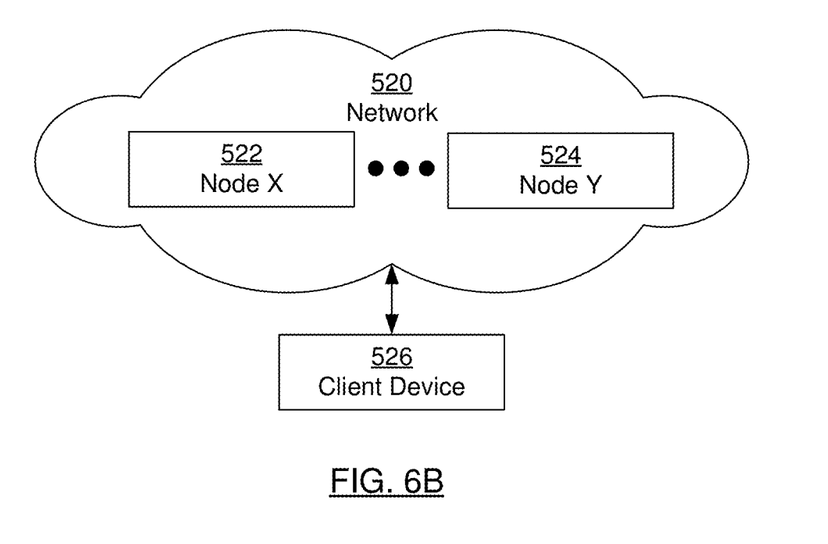

FIG. 1 shows a flow diagram of a system (100) in accordance with one or more embodiments. The system (100) includes a user computing system (102), a tracking pixel server (104), and a web server (106). Although FIG. 1 shows a single user computing system (102), the system (100) may include arbitrarily many user computing systems (102), such as thousands or millions of computing systems (102) of end users of an application. In one or more embodiments, each user computing system (102) provides, to a user, a variety of computing functionality. For example, the computing functionality may include word processing, multimedia processing, financial management, business management, social network connectivity, network management, and/or various other functions that a computing device performs for a user. The user may be a company employee that acts as a sender, a potential sender, or a requestor of services performed by a company (e.g., a client, a customer, etc.) of the user computing system. A user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computer systems (102), tracking pixel server (104), and web server (106) may take the form of the computing system (500) shown in FIG. 6A connected to a network (520) as shown in FIG. 6B.

In one or more embodiments, each user computing system (102) includes a browser (110). The browser (110) is a software application that is used to access and/or view websites. The browser (110) includes functionality to request and/or receive an application (112) from a web server (106) and execute the application (112). The web server (106) is configured to serve or otherwise provide the application to each computing system. The web server (106) may be a virtual machine or a physical server.

For example, the application may be a web application that is executed in the web browser. The application (112) is a software application that includes executable instructions stored, temporarily or permanently, in whole or in part, in memory. The instructions, when executed by one or more processors, enable a device to perform the functions described in accordance with one or more embodiments.

The application (112) may be represented using a collection of computer instructions (e.g., statements) written in a programming language. The application (112) includes CSS selectors (116A, 116N). A CSS selector (116A) is an instruction that selects (e.g., specifies) the HyperText Markup Language (HTML) element(s) in a webpage to which a CSS rule applies.

The CSS selector (116A) may include one or more properties (e.g., attributes). The use of the term property or attribute of CSS selector in the present application corresponds to the standard definition in the art for CSS selectors. Further, each CSS selector (116A, 116N) includes a CSS selector ID (118A, 118N) and/or a uniform resource locator (URL) of a tracking pixel (120A, 120N).

The CSS selector ID (118A) is an identifier that uniquely identifies the CSS selector (116A). The URL of a tracking pixel (120A) is a URL link that resolves to a tracking pixel. A tracking pixel is a graphic that is loaded by a browser (110) from a server (e.g., tracking pixel server (104)) when the browser (110) accesses a specific instruction, in this case, the CSS selector (116A). The dimensions of the tracking pixel are small. For example, the graphic may be a 1×1 pixel, also known as a pixel tag.

The URL of the tracking pixel (120A) may resolve to a memory location of the tracking pixel server (104). The URL of the tracking pixel (120A) includes the CSS selector ID (118A) of the CSS selector (116A) that includes the URL of the tracking pixel (120A). Specifically, in addition to the CSS selector (116A, 116N) having the CSS selector ID (118A, 118N), the URL of the tracking pixel separately includes, embedded in the URL, the CSS selector ID (118A, 118N). For example, the URL of a tracking pixel, "https://example.com/gifs/ABC123.gif," includes the CSS selector ID "ABC123," which corresponds to a specific CSS selector.

In one or more embodiments, the URL of the tracking pixel (120A) is the value of a property of the CSS selector (116A). For example, the URL of the tracking pixel (120A) may be the value of a "background-image" property of the CSS selector (116A).

In one or more embodiments, the URL of the tracking pixel (120A) is optionally included in a portion of CSS selectors for which dependency analysis should be performed. In other words, only a subset of CSS selectors of the application (112) may include the URL of a tracking pixel (120A). For example, the total number of CSS selectors (116A, 116N) of the application (112) may be large, and it may be desirable to focus on the subset of CSS selectors. Continuing this example, the subset of CSS selectors may be included in a single CSS file that is a candidate for obsolescence (e.g., deletion). Other CSS selectors, such as those frequency executed and therefore known not to be a candidate for obsolescence, may not include the URL of the tracking pixel.

In one or more embodiments, the application (112) is hosted at the web server (106) and/or the tracking pixel server (104). For example, CSS selectors (116A, 116N) of the application (112) that include URLs of tracking pixels (120A, 120N) may be hosted by the tracking pixel server (104) and CSS selectors (116A, 116N) of the application (112) that do not include URLs of tracking pixels may be hosted by the web server (106).

The browser (110) includes functionality to send a tracking pixel request (122) to the tracking pixel server (104). The tracking pixel request (122) includes a URL of a tracking pixel (120A) and a session ID corresponding to a session of the browser (110) sending the tracking pixel request (122).

The destination address specified in the tracking pixel request is the URL of the tracking pixel.

The browser (110) includes functionality to receive a scan request (124) from the tracking pixel server (104). The scan request (124) includes the CSS selector ID (118A) of the URL of the tracking pixel (120A) and the session ID of the tracking pixel request (122).

The browser (110) includes functionality to send session scan results (126) to the tracking pixel server (104). The browser (110) includes functionality to send session scan results (126) in response to receiving a scan request (124) from the tracking pixel server (104). The session scan results (126) may be the result of a scan of the document object model (DOM) of the browser (110). The session scan results (126) may include dependencies of code fragments in the DOM on a specific CSS selector (116A). For example, the specific CSS selector (116A) may correspond to the CSS selector ID (118A) included in the scan request (124). Continuing this example, a dependent code fragment (e.g., dependent code fragment (134Q)) may be an HTML element that references the CSS selector (116A). As another example, a dependent code fragment may be a code fragment in a CSS declaration or a CSS rule that references the CSS selector (116A). The session scan results (126) may include the session ID of the scan request (124).

The tracking pixel server (104) is communicatively connected to the user computing systems such as through one or more networks. The tracking pixel server (104) includes functionality to receive and count the number of tracking pixel requests (122) corresponding to CSS selector IDs (118A, 118N) from the browsers (110) of one or more user computing systems (102). The tracking pixel server (104) further includes functionality to aggregate session scan results (126) received from the browsers (110) of one or more user computing systems (102).

The tracking pixel server (104) includes a data repository (130). The data repository (130) is any type of storage unit and/or device (e.g., a file system, database, collection of tables, or any other storage mechanism) for storing data. Further, the data repository (130) may include multiple different storage units and/or devices. The multiple different storage units and/or devices may or may not be of the same type or located at the same physical site. The data repository (130) may be accessed online via a cloud service (e.g., Amazon Web Services, Egnyte, Azure, etc.).

The data repository (130) includes functionality to store the tracking pixel requests (122) received by the tracking pixel server (104). The data repository (130) includes functionality to store aggregated CSS selector scan results (132A, 132N) corresponding to CSS selector IDs (118A, 118N). For example, the aggregated CSS selector scan results (132A) corresponding to a specific CSS selector ID (118A) may be the result of aggregating session scan results (126) for the CSS selector ID (118A) received from one or more sessions of the browsers (110) of one or more user computing systems (102). In one or more embodiments, the data repository (130) may store an obsolescence flag (not shown) with the CSS selector ID (118A) indicating whether the CSS selector (116A) corresponding to the CSS selector ID (118A) is a candidate for obsolescence.

The aggregated CSS selector scan results (132A) for a CSS selector ID (118A) may include dependent code fragment IDs (134Q, 134Z) and dependent code fragment metadata (136Q, 136Z). Each dependent code fragment ID (134Q) corresponds to a code fragment (e.g., an HTML element) that depends on the CSS selector (116A) corresponding to the CSS selector ID (118A). The dependent code fragment metadata (136Q) includes information about the code fragment corresponding to the dependent code fragment ID (134Q). The tracking pixel server (104) includes functionality to count the number of dependent code fragment IDs (134Q, 134Z) corresponding to a specific CSS selector ID (118A).

In one or more embodiments, dependent code fragment metadata (136Q) includes an application ID, a domain, a URL, a component ID, a runtime context and/or additional attributes associated with a code fragment. The application ID may be an identifier associated with an application (e.g., application (112)) executed by a browser (110). The domain may be a network domain corresponding to a website associated with the application corresponding to the application ID. The URL may correspond to a website associated with the application corresponding to the application ID. The component ID may be an identifier of a software component (e.g., a plugin or widget) including the dependent code fragment corresponding to the dependent code fragment ID (134Q). The runtime context may include the states of one or more runtime and/or environment variables of the application corresponding to the application ID.

While FIG. 1 shows a configuration of components, other configurations may be used without departing from the scope of the invention. For example, various components may be combined to create a single component. As another example, the functionality performed by a single component may be performed by two or more components.

Figure 2:
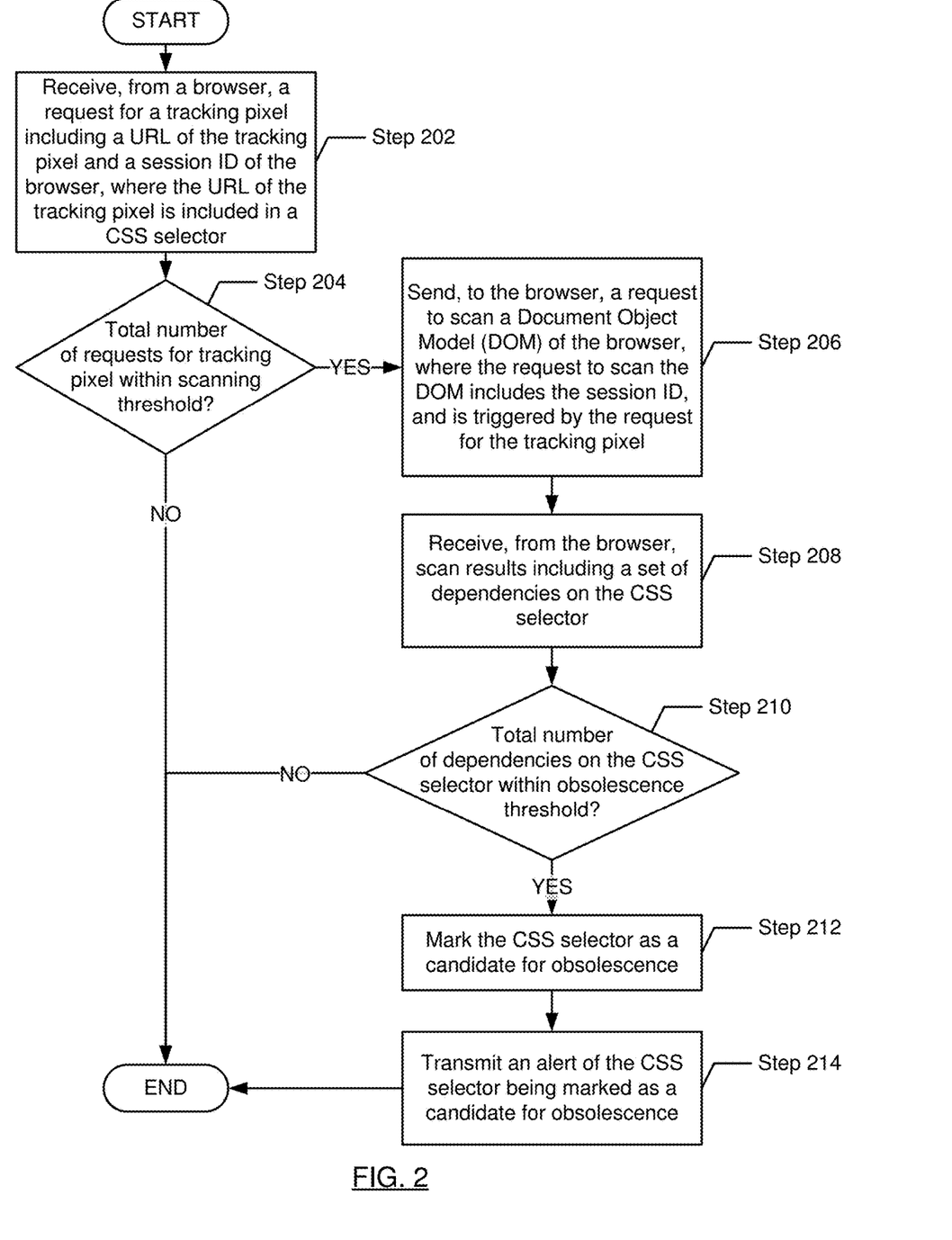
FIG. 2, FIG. 3, and FIG. 4 show flowcharts in accordance with one or more embodiments of the invention.

FIG. 2 shows a flowchart in accordance with one or more embodiments of the invention. The flowchart depicts a process for identifying code dependencies in a web application. One or more of the steps in FIG. 2 may be performed by the components (e.g., the tracking pixel server (104) and the browser (110) of the user computing system (102)), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a request for a tracking pixel is received from a browser. The request for the tracking pixel includes a uniform resource locator (URL) of the tracking pixel and a session ID of the browser of the browser session that sent the request for the tracking pixel. The request for the tracking pixel may be triggered when the CSS selector corresponding to the CSS selector ID of the URL of the tracking pixel is accessed by a code fragment in the document object model (DOM) of the browser. For example, the CSS selector may have been accessed by a HyperText Markup Language (HTML) element in the DOM. The request for the tracking pixel may be received via the HyperText Transport Protocol (HTTP) protocol.

If, in Step 204, it is determined that the total number of requests for the tracking pixel is within a scanning threshold, then the steps below are executed. The tracking pixel server may store requests for the tracking pixel received from multiple sessions of one or more browsers executing on one or more user computing systems. Storing the requests may be performed by storing a count of the total number of requests received in a specified timespan. When the total number of requests for the tracking pixel exceeds the scanning threshold, then obtaining additional scan results corresponding to the CSS selector that includes the tracking pixel may be unnecessary. For example, one motivation for scanning the DOMs of browsers may be to determine whether the CSS selector that includes the tracking pixel is obsolete. Continuing this example, when there are many requests for the tracking pixel (e.g., when the total number of requests for the tracking pixel exceeds the scanning threshold), then it is unlikely that the CSS selector will be a candidate for obsolescence.

In Step 206, a request to scan the DOM of the browser is sent to the browser. In one or more embodiments, the tracking pixel server sends the request to scan the DOM of the browser over a point-to-point connection to the specific browser session that sent the request for the tracking pixel. For example, the tracking pixel server may send the request to scan the DOM of the browser via a remote procedure call (RPC) to the specific browser session that sent the request for the tracking pixel. In one or more embodiments, the tracking pixel server sends the RPC via a websocket connection. The request to scan the DOM includes the CSS selector ID of the URL of the tracking pixel and the session ID of the request for the tracking pixel. The session ID is used to identify the browser session that sent the request for the tracking pixel. The CSS selector ID identifies the CSS selector that is the focus of the scan.

In Step 208, scan results are received from the browser. For example, the tracking pixel server may receive the scan results from the browser via the point-to-point connection (e.g., the websocket connection) mentioned in Step 206 above. The scan results include a set of dependencies on the CSS selector. Each dependency may be a code fragment in the DOM that depends on (e.g., references) the CSS selector. The tracking pixel server may store, for the CSS selector ID, scan results received from multiple sessions of one or more browsers executing on one or more user computing systems. The tracking pixel server aggregates, for the CSS selector ID, the scan results received from multiple sessions of one or more browsers executing on one or more user computing systems. For example, the tracking pixel server may determine a count of the total number of dependencies on the CSS selector based on the scan results for the corresponding CSS selector ID received from the multiple sessions of the one or more browsers.

The scan of the DOM is efficient and scalable because the scan focuses on identifying dependencies on a single CSS selector. Furthermore, the DOM is scanned incrementally, on demand, as CSS selectors are used during browser sessions.

If, in Step 210, it is determined that the total number of dependencies on the CSS selector is within an obsolescence threshold, then Step 212 and Step 214 below are executed. The tracking pixel server may determine the total number of dependencies on the CSS selector by querying the data repository with the CSS selector ID of the CSS selector.

In Step 212, the CSS selector is marked as a candidate for obsolescence. In one or more embodiments, the tracking pixel server may set, in the data repository, an obsolescence flag corresponding to the CSS selector ID of the CSS selector. If the CSS selector has only a few dependencies, then the code that is dependent on the CSS selector may be a candidate to be dependent on an alternative CSS selector. As such, the CSS selector only serves to increase the size of the application. Thus, identifying and subsequently removing obsolete CSS selectors from an application may reduce the size of the application, and thus improve the performance of the application.

In Step 214, an alert of the CSS selector being marked as a candidate for obsolescence is transmitted. The tracking pixel server may transmit the alert to an owner of a software component (e.g., a plugin or widget) that depends on the CSS selector. The tracking pixel server may identify the software component that depends on the CSS selector using dependent code fragment metadata corresponding to a dependent code fragment (e.g., an HTML element) in the aggregated CSS selector scan results for the CSS selector ID. The owner may be a point of contact responsible for the software component. The owner may be represented as an email address for one or more individuals or groups. The alert may request that the owner of the software component to use an alternative to the CSS selector that is marked as a candidate for obsolescence, thus facilitating a transition to a smaller codebase. Furthermore, the dependent code fragment may also be a candidate for removal.

The capability to identify code fragments and/or software components that are dependent on the CSS selector enhances the maintainability and/or testability of a codebase because the impact of a potential change to the CSS selector may be assessed. For example, prior to changing a CSS selector, a developer or tester may identify impacted code fragments and/or software components, if any. Without such a capability, developers may be unable to accurately predict the impact of changes to a CSS selector on a codebase, and may opt instead to create a new code instead of modifying an existing CSS selector, thus increasing the size of the codebase.

Figure 3:
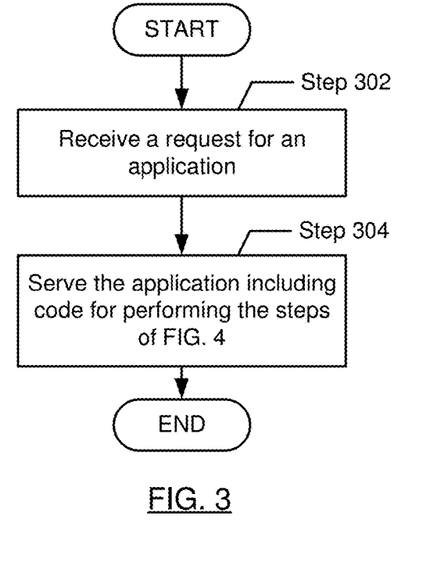

FIG. 3 shows a flowchart in accordance with one or more embodiments of the invention. The flowchart depicts a process for serving a web application. One or more of the steps in FIG. 3 may be performed by the components (e.g., the tracking pixel server (104), the web server (106), and the browser (110) of the user computing system (102)), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, a request is received for an application. The web server and/or the tracking pixel server may receive the request from the browser of the user computing system. For example, the browser may request an application corresponding to a web site served by the web server.

In Step 304, the application is served. In one or more embodiments, the web server serves the application to the browser. Alternatively, in one or more embodiments, the web server serves the CSS selectors of the application that do not include a URL of a tracking pixel, and the tracking pixel server serves the CSS selectors of the application that do include a URL of a tracking pixel. The application includes code for performing the steps of FIG. 4, as described below.

Figure 4:
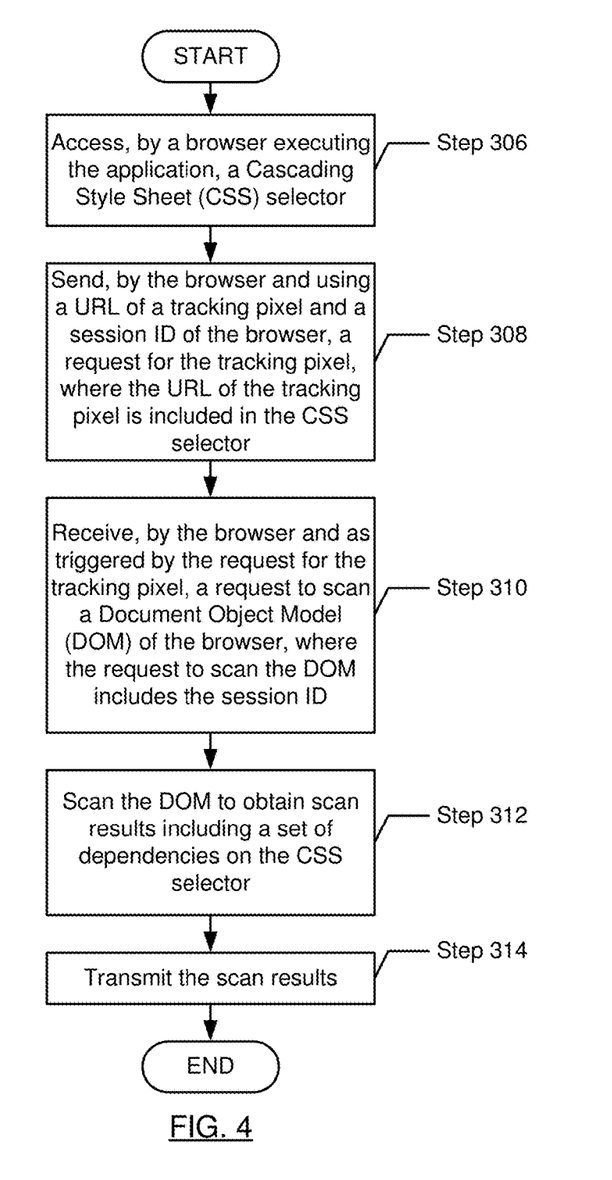

FIG. 4 shows a flowchart in accordance with one or more embodiments of the invention. The flowchart depicts a process for identifying code dependencies in a web application. One or more of the steps in FIG. 4 may be performed by the components (e.g., the tracking pixel server (104) and the browser (110) of the user computing system (102)), discussed above in reference to FIG. 1. In one or more embodiments of the invention, one or more of the steps shown in FIG. 4 may be omitted, repeated, and/or performed in parallel, or in a different order than the order shown in FIG. 4. Accordingly, the scope of the invention should not be considered limited to the specific arrangement of steps shown in FIG. 4.

Initially, in Step 306, a CSS selector is accessed by a browser executing the application (see description of Step 202 above). The application executed by the browser is the application served in Step 304 above. As the browser executes the application, the browser executes the various statements of the application code.

In Step 308, a request for a tracking pixel is sent using a uniform resource locator (URL) of the tracking pixel and a session ID of the browser (see description of Step 202 above). When the browser executes the CSS selector statement, the browser obtains the URL of the tracking pixel from the CSS selector statement. Based on the URL of the tracking pixel, the browser sends the tracking pixel request to the tracking pixel circuit. The request for the tracking pixel is sent by the browser to the tracking pixel server.

In Step 310, a request to scan the DOM of the browser is received by the browser (see description of Step 206 above). The request to scan the DOM includes the session ID and is received from the tracking pixel server. The tracking pixel server sends the request to scan the DOM in response to receiving the request for the tracking pixel.

In Step 312, the DOM is scanned to obtain scan results (see description of Step 208 above). The scan results are obtained in response to the request to scan the DOM.

In Step 314, the scan results are transmitted. The scan results are transmitted to the tracking pixel server by the browser. For example, the scan results may be transmitted via a secure communication channel to the tracking pixel server.

Figure 5A:
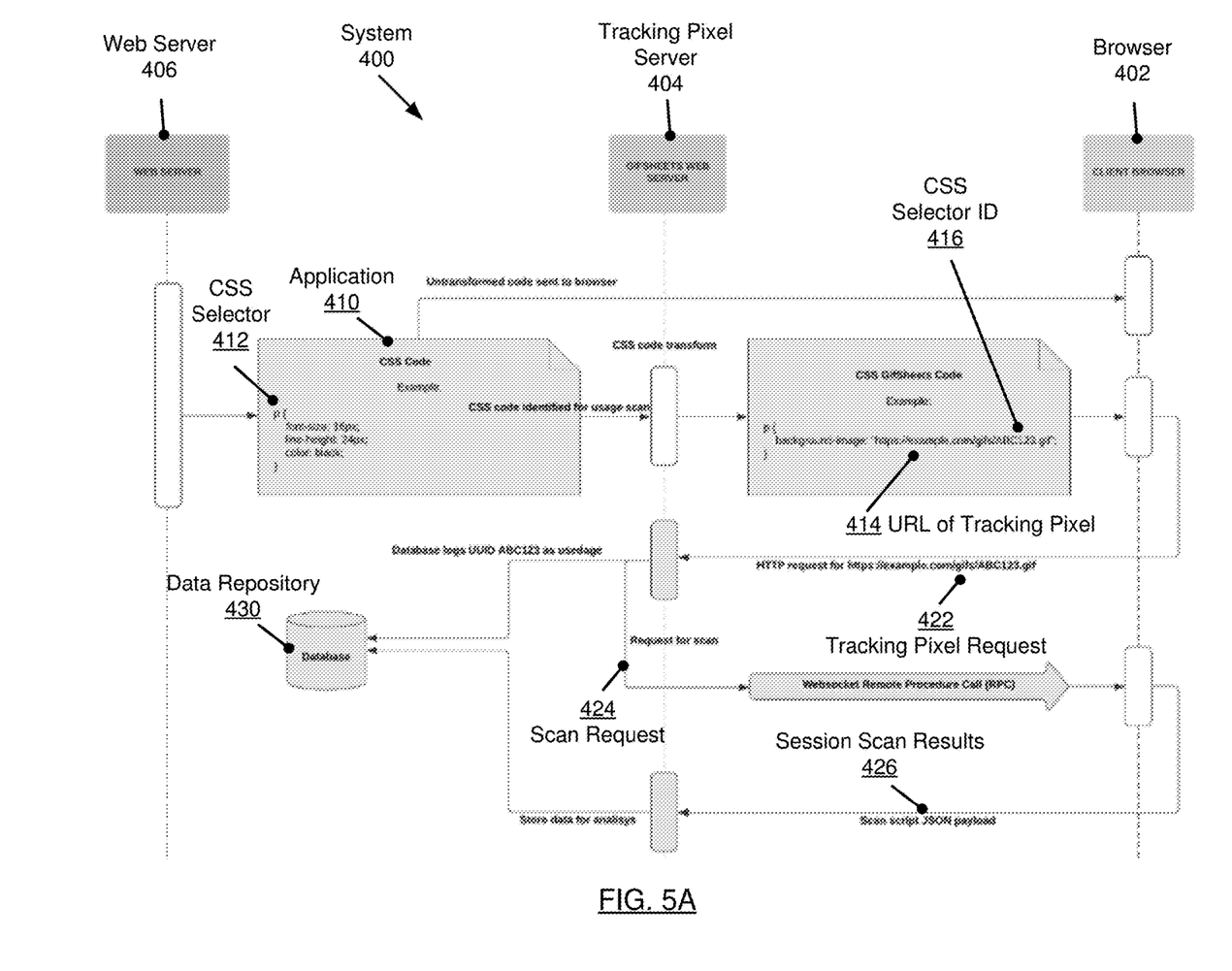
FIG. 5A and FIG. 5B show examples in accordance with one or more embodiments of the invention.
Figure 5B:
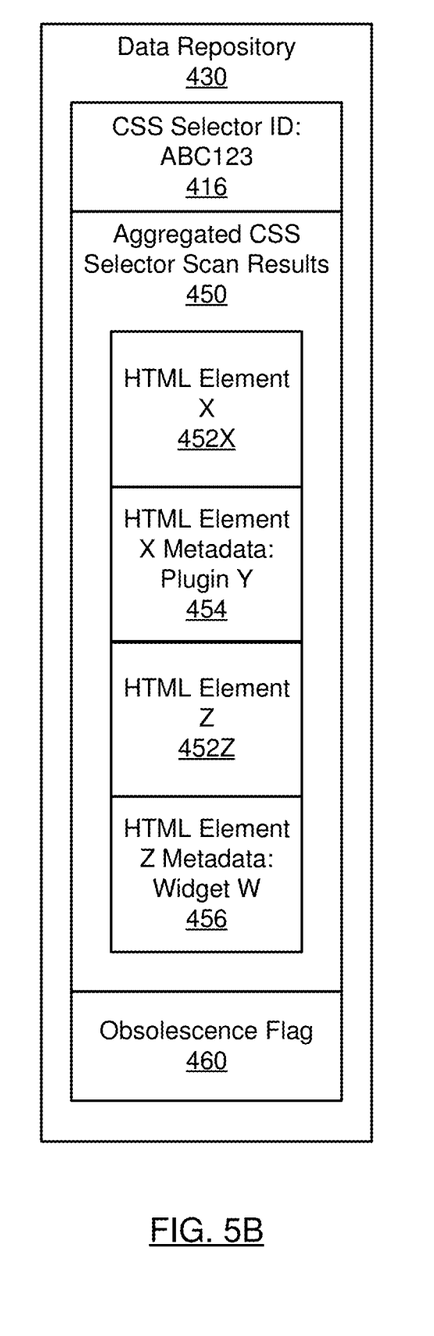

The following example is for explanatory purposes only and not intended to limit the scope of the invention. FIG. 5A and FIG. 5B show an implementation example in accordance with one or more embodiments of the invention. FIG. 5A shows a system (400) that includes a browser (402) ((110) in FIG. 1), a tracking pixel server (404) ((104) in FIG. 1), and a web server (406) ((106) in FIG. 1). The tracking pixel server (404) serves, to the browser (402), a CSS selector (412) ((116A, 116N) in FIG. 1) of an application (410) ((112) in FIG. 1). The CSS selector (412) includes, as its background-image property, a URL of a tracking pixel (414) ((120A, 120N) in FIG. 1). The web server (406) serves, to the browser (402), the CSS selectors of the application (410) that do not include a URL of a tracking pixel.

During the course of a user session, the browser (402) accesses the CSS selector (412). Accessing the CSS selector (412) triggers the sending of a tracking pixel request (422) ((122) in FIG. 1) from the browser (402) to the tracking pixel server (404) via the HTTP protocol. The tracking pixel request (422) includes the URL of a tracking pixel (414) and a session ID corresponding to a user session of the browser. The URL of the tracking pixel (414) includes the CSS selector ID "ABC123" (416) ((118A, 118N) in FIG. 1) of the CSS selector (412).

The tracking pixel server (404) stores the tracking pixel request (422) in the data repository (430) ((130) in FIG. 1). The tracking pixel server (404) has already stored, in the data repository (430), tracking pixel requests corresponding to the same CSS selector ID "ABC123" (416) that were received from multiple sessions of multiple browsers executing on multiple user computing systems. Because the total number of tracking pixel requests for the CSS selector ID "ABC123" (416) is within the scanning threshold, the tracking pixel server (404) sends a scan request (424) ((124) in FIG. 1) to the browser (402). The scan request (424) is sent as an remote procedure call (RPC) via a websocket connection. The scan request (424) includes the session ID, which is used to identify the user session of the browser (402) that sent the tracking pixel request (422). The browser (402) then performs a scan of its Document Object Model (DOM) to obtain session scan results (426) ((126) in FIG. 1) for the user session corresponding to the session ID. The browser (402) sends the session scan results (426) to the tracking pixel server (404) in the JavaScript Object Notation (JSON) format.

Turning to FIG. 5B, the tracking pixel server (404) aggregates the session scan results of multiple sessions of multiple browsers executing on multiple user computing systems into aggregated CSS selector scan results (450) corresponding to the CSS selector (412). The tracking pixel server (404) stores the aggregated CSS selector scan results (450) in the data repository (430).

The aggregated CSS selector scan results (450) contain dependencies of 2 HTML elements (452X, 452Z) ((134Q, 134Z) in FIG. 1) on the CSS selector (412) corresponding to the CSS selector ID "ABC123" (416). The HTML element metadata (454) ((136Q, 136Z) in FIG. 1) for HTML element X (452X) indicates that HTML element X (452X) is included in plugin Y. The HTML element metadata (456) for HTML element Z (452Z) indicates that HTML element Z (452Z) is included in widget W. Because the total number of dependencies on the CSS selector ID "ABC123" (416) is within the obsolescence threshold, the tracking pixel server (404) marks the CSS selector (412) as a candidate for obsolescence by setting, in the data repository (430), an obsolescence flag (460) corresponding to the selector ID "ABC123" (416). The tracking pixel server (404) also sends an alert to the owners of the software components plugin Y and widget W. The alert notifies the owners of plugin Y and widget W that CSS selector (412) has been marked as a candidate for obsolescence, in order to encourage the owners of plugin Y and widget W to phase out their use of the CSS selector (412).

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 6A may be connected to or be a part of a network. For example, as shown in FIG. 6B, the network (520) may include multiple nodes (e.g., node X (522), node Y (524)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 6A. Further, the client device (526) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, from a browser, a request for a tracking pixel comprising a uniform resource locator (URL) of the tracking pixel and a session identifier (ID) of the browser, wherein the URL of the tracking pixel is included in a CSS selector;
sending, to the browser and as triggered by the request for the tracking pixel, a request to scan a document object model (DOM) of the browser, wherein the request to scan the DOM comprises the session ID; and
receiving, from the browser, scan results comprising a set of dependencies on the CSS selector.

2. The method of claim 1, further comprising:
storing a plurality of requests for the tracking pixel; and
determining that the total number of requests for the tracking pixel is within a scanning threshold, wherein the request to scan the DOM is sent in response to the total number of requests for the tracking pixel being within the scanning threshold.

3. The method of claim 1, further comprising:
determining that the total number of dependencies on the CSS selector is within an obsolescence threshold; and
in response to the total number of dependencies on the CSS selector being within an obsolescence threshold:
marking the CSS selector as a candidate for obsolescence; and
transmitting an alert of the CSS selector being marked as a candidate for obsolescence.

4. The method of claim 3, wherein receiving the scan results further comprises receiving scan results further comprising:
an identifier of a code fragment that depends on the CSS selector, and
an identifier of a software component that comprises the code fragment,
wherein the alert is transmitted to an owner of the software component.

5. The method of claim 1, wherein the request to scan the DOM is sent via a remote procedure call (RPC).

6. The method of claim 5, wherein the RPC is sent via a websocket connection, and wherein the scan results are received via the websocket connection.

7. The method of claim 1, wherein the URL of the tracking pixel is a property of the CSS selector.

8. A system, comprising:
an application comprising a CSS selector; and
a tracking pixel server comprising a processor and memory and configured to:
receive, from a browser, a request for a tracking pixel comprising a uniform resource locator (URL) of the tracking pixel and a session identifier (ID) of the browser, wherein the URL of the tracking pixel is included in the CSS selector,
in response to receiving the request for the tracking pixel, send, to the browser and as triggered by the request for the tracking pixel, a request to scan a document object model (DOM) of the browser, wherein the request to scan the DOM comprises the session ID, and
receive, from the browser, scan results comprising a set of dependencies on the CSS selector.

9. The system of claim 8, wherein the tracking pixel server is configured to:
store a plurality of requests for the tracking pixel; and
determine that the total number of requests for the tracking pixel is within a scanning threshold, wherein the tracking pixel server sends the request to scan the DOM in response to the total number of requests for the tracking pixel being within the scanning threshold.

10. The system of claim 8, wherein the server is configured to:
determine that total number of dependencies on the CSS selector is within an obsolescence threshold; and
in response to the total number of dependencies on the CSS selector being within an obsolescence threshold:
mark the CSS selector as a candidate for obsolescence; and
transmit an alert of the CSS selector being marked as a candidate for obsolescence.

11. The system of claim 10, wherein receiving the scan results further comprises receiving scan results further comprising:
an identifier of a code fragment that depends on the CSS selector, and
an identifier of a software component that comprises the code fragment, wherein the alert is transmitted to an owner of the software component.

12. The system of claim 8, wherein the tracking pixel server is configured to send the request to scan the DOM via a remote procedure call (RPC).

13. The system of claim 12, wherein the tracking pixel server is further configured to send the RPC via a websocket connection, and wherein the tracking pixel server is further configured to receive the scan results via the websocket connection.

14. The system of claim 8, wherein the URL of the tracking pixel is a property of the CSS selector.

15. A method comprising:
receiving a request for an application; and
serving the application comprising code for:
accessing, by a browser executing the application, a Cascading Style Sheet (CSS) selector;
in response to accessing the CSS selector, sending, by the browser and using a uniform resource locator (URL) of a tracking pixel and a session identifier (ID) of the browser, a request for the tracking pixel, wherein the URL of the tracking pixel is included in the CSS selector;
receiving, by the browser and as triggered by the request for the tracking pixel, a request to scan a document object model (DOM) of the browser, wherein the request to scan the DOM comprises the session ID;
in response to receiving the request to scan the DOM, scanning the DOM to obtain scan results comprising a set of dependencies on the CSS selector; and
transmitting the scan results.

16. The method of claim 15, wherein the application further comprises code to receive the request to scan the DOM via a remote procedure call (RPC).

17. The method of claim 16, wherein the application further comprises code to receive the RPC from a server via a websocket connection, and wherein the application further comprises code to transmit the scan results via the websocket connection.

18. The method of claim 17, wherein the server is configured to:
store a plurality of requests for the tracking pixel, the plurality of requests for the tracking pixel comprising the request for the tracking pixel; and
determine that the total number of requests for the tracking pixel is within a scanning threshold, wherein the server sends the request to scan the DOM in response to the total number of requests for the tracking pixel being within the scanning threshold.

19. The method of claim 17, wherein the server is configured to:

determine that the total number of dependencies on the CSS selector is within an obsolescence threshold; and in response to the total number of dependencies on the CSS selector being within the obsolescence threshold:

mark the CSS selector as a candidate for obsolescence; and transmit an alert of the CSS selector being marked as a candidate for obsolescence.

20. The method of claim 15, wherein the URL of the tracking pixel is a property of the CSS selector.

* * * * *